United States Patent
Wang (10) Patent No.: US 11,818,669 B2
(45) Date of Patent: Nov. 14, 2023

(54) METHOD, APPARATUS AND COMPUTER READABLE MEDIA FOR POWER CONTROL IN A WIRELESS COMMUNICATION SYSTEM

(71) Applicant: NEC CORPORATION, Tokyo (JP)

(72) Inventor: Gang Wang, Beijing (CN)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/277,635

(22) PCT Filed: Sep. 19, 2018

(86) PCT No.: PCT/CN2018/106542
§ 371 (c)(1),
(2) Date: Mar. 18, 2021

(87) PCT Pub. No.: WO2020/056638
PCT Pub. Date: Mar. 26, 2020

(65) Prior Publication Data
US 2022/0030523 A1   Jan. 27, 2022

(51) Int. Cl.
*H04W 52/26* (2009.01)
*H04W 52/24* (2009.01)
*H04W 52/38* (2009.01)

(52) U.S. Cl.
CPC ....... *H04W 52/265* (2013.01); *H04W 52/241* (2013.01); *H04W 52/242* (2013.01);
(Continued)

(58) Field of Classification Search
CPC ............. H04W 52/265; H04W 52/241; H04W 52/242; H04W 52/243; H04W 52/262; H04W 52/383
See application file for complete search history.

(56) References Cited

U.S. PATENT DOCUMENTS

2008/0200200 A1  8/2008 Usuda et al.
2013/0178221 A1* 7/2013 Jung ............... H04W 52/146
                                                    455/450

(Continued)

FOREIGN PATENT DOCUMENTS

CN   101123601 A   2/2008
CN   103139889 A   6/2013
(Continued)

OTHER PUBLICATIONS

International Search Report for PCT/CN2018/106542 dated Apr. 29, 2019 [PCT/ISA/210].
(Continued)

*Primary Examiner* — John J Lee
(74) *Attorney, Agent, or Firm* — Sughrue Mion, PLLC (57) ABSTRACT

Embodiments of the present disclosure relate to methods, apparatuses and computer program products for power control. A method implemented at a first terminal device comprises determining one or more power control parameters for a transmission from a second terminal device to the first terminal device; transmitting the one or more power control parameters to the second terminal device; and receiving the transmission from the second terminal device, the transmission being controlled based on the one or more power control parameters. With some proposed embodiments, transmission between the first device and the second device may be performed more efficiently.

8 Claims, 5 Drawing Sheets

(52) U.S. Cl.
CPC ....... *H04W 52/243* (2013.01); *H04W 52/262* (2013.01); *H04W 52/383* (2013.01)

(56) References Cited

U.S. PATENT DOCUMENTS

| | | |
|---|---|---|
| 2014/0179363 A1 | 6/2014 | Nishikawa et al. |
| 2016/0150484 A1 | 2/2016 | Seo et al. |
| 2016/0205534 A1 | 7/2016 | Fujishiro |
| 2017/0079084 A1 | 3/2017 | Matsumoto |
| 2017/0215027 A1 | 7/2017 | Yokomakura et al. |
| 2021/0219345 A1* | 7/2021 | Agiwal ............ H04W 72/0406 |
| 2021/0400594 A1 | 12/2021 | Takeda et al. |

FOREIGN PATENT DOCUMENTS

| | | |
|---|---|---|
| CN | 104904279 A | 9/2015 |
| CN | 105934978 A | 9/2016 |
| CN | 107018564 A | 8/2017 |
| JP | 2013-118512 A | 6/2013 |
| JP | 2015-195587 A | 11/2015 |
| WO | WO-2015019179 A2 * | 2/2015 .......... H04W 52/242 |
| WO | 2015/170766 A1 | 11/2015 |
| WO | 2016/017672 A1 | 2/2016 |
| WO | 2018/084205 A1 | 5/2018 |

OTHER PUBLICATIONS

Written Opinion for PCT/CN2018/106542 dated Apr. 29, 2019 [PCT/ISA/237].

JP Office Action for JP Application No. 2021-515071, dated Oct. 4, 2022 with English Translation.

Office Action dated May 31, 2023 in Chinese Application No. 201880099612.7.

* cited by examiner

METHOD, APPARATUS AND COMPUTER READABLE MEDIA FOR POWER CONTROL IN A WIRELESS COMMUNICATION SYSTEM

CROSS REFERENCE TO RELATED APPLICATIONS

This application is a National Stage of International Application No. PCT/CN2018/106542 filed Sep. 19, 2018.

FIELD

Non-limiting and example embodiments of the present disclosure generally relate to a technical field of wireless communication, and specifically to methods, apparatuses and computer program products for power control in a wireless communication system.

BACKGROUND

This section introduces aspects that may facilitate better understanding of the disclosure. Accordingly, the statements of this section are to be read in this light and are not to be understood as admissions about what is in the prior art or what is not in the prior art.

In wireless communication systems, there is a requirement for supporting increasing types of services. For instance, Vehicle to anything (V2X) sidelink (SL) was introduced in Long Term Evolution (LTE) Release 14 developed by the Third Generation Partnership Project (3GPP) to support direct communication of basic road safety services between vehicle and vehicle/pedestrian/infrastructure.

In the wireless communication systems with increasing number of devices and services, transmission power of a device has to be well controlled, so as to guarantee satisfying communication performance of the device, minimized power consumption, and/or minimized interference to other devices.

SUMMARY

Various embodiments of the present disclosure mainly aim at providing methods, apparatuses and computer program products for power control in a wireless communication system.

In a first aspect of the disclosure, there is provided a method implemented at a first terminal device. The method comprises determining one or more power control parameters for a transmission from a second terminal device to the first terminal device; transmitting the one or more power control parameters to the second terminal device; and receiving the transmission from the second terminal device, the transmission being controlled based on the one or more power control parameters.

In some embodiments, the one or more power control parameters may include at least one of: a power adjustment value relative to a reference power level, a base power level, and a pathloss compensation factor. The reference power level may comprises a transmission power determined for the transmission based on one or more of: a power control parameter which is configured by a base station or preconfigured, a pathloss between the second terminal device and the base station, and a power compensation associated with a modulation and coding scheme, (MCS) and/or a quality of service (QoS) level of the transmission.

In some embodiments, determining one or more power control parameters may comprise: determining the power adjustment value by comparing a measured performance metric to a target performance metric. In some embodiments, the performance metric may comprise a signal to interference and noise power ratio (SINR).

In some embodiments, the method may further comprise determining an averaged receiving SINR based on one or more transmissions from the second device to obtain the measured performance metric, wherein transmission power of the one or more transmissions is determined based on at least one of: a power control parameter configured by a base station or preconfigured, a pathloss between the second terminal device and the base station, and a power compensation associated with a MCS and/or a QoS level of the transmission. In some embodiments, determining the averaged receiving SINR based on the one or more transmissions from the second device may comprise: obtaining an estimated receiving SINR for each of the one or more transmissions; and determining an averaged value of the estimated receiving SINRs as the averaged receiving SINR.

In some embodiments, obtaining the estimated receiving SINR for each of the one or more transmissions may comprise: obtaining the estimated receiving SINR by removing power compensation associated with a MCS and/or a QoS level for each of the one or more transmissions.

In some embodiments, determining the one or more power control parameters may comprise: determining the base power level and the pathloss compensation factor based on a target receiving SINR and a pathloss between the first terminal device and the second terminal device. In some embodiments, the determined the base power level and the pathloss compensation factor satisfies a restriction that a receiving power at the first terminal device is no larger than a target receiving power.

In some embodiments, the method may further comprise: determining a power offset for a further transmission from the second terminal device based on one or more transmissions received from the second terminal device, wherein transmission power of the one or more transmissions is determined based on the one or more power control parameters; and transmitting the power offset to the second terminal device. In some embodiments, the determined power offset is below a difference between a target receiving SINR and a measured receiving SINR.

In a second aspect of the disclosure, there is provided another method implemented at a second terminal device. The method comprises receiving, from a first terminal device, one or more power control parameters for a transmission from the second terminal device to the first terminal device; determining a transmission power for the transmission based on the one or more power control parameters; and performing the transmission to the first terminal device according to the determined transmission power.

In some embodiments, the one or more power control parameters may include at least one of: a power adjustment value relative to a reference power level, a base power level, and a pathloss compensation factor. In some embodiments, the reference power level may comprise a transmission power determined for the transmission based on one or more of: a power control parameter configured by a base station or preconfigured, a pathloss between the second terminal device and the base station, and a power compensation associated with a MCS and/or a QoS level of the transmission.

In some embodiments, the one or more power control parameters may include the power adjustment value, and wherein determining the transmission power may comprise: determining a candidate transmission power based on a sum of the power adjustment value and the reference power level; and determine the transmission power as a minimum one of the candidate transmission power and a transmission power limit.

In some embodiments, the method may further comprise: receiving a power offset for the transmission from the first terminal device; and wherein determining the transmission power may comprise: determining an averaged transmission power of one or more transmissions performed with a transmission power determined based on the one or more power control parameters; determining a candidate transmission power based on a sum of the power offset and the averaged transmission power; and determining the transmission power as a minimum one of a transmission power limit and the candidate transmission power.

In some embodiments, the one or more power control parameters may include the base power level and the pathloss compensation factor, and wherein determining the transmission power may comprise: determining a candidate transmission power based on a sum of the base power level and a pathloss between the first terminal device and the second terminal device weighted by the pathloss compensation factor; and determining the transmission power as a minimum one of a transmission power limit and the candidate transmission power. In some embodiments, the method may further comprise: receiving a power offset for the transmission from the first terminal device; and wherein determining the candidate transmission power may comprise: determining the candidate transmission power further based on the power offset. In some embodiments, determining the candidate transmission power may comprise: determining the candidate transmission power further based on an accumulative value of previous power offsets received from the first terminal device.

In some embodiments, determining a candidate transmission power may comprise: determining the candidate transmission power further based on a power compensation associated with a MCS and/or a QoS level of the transmission.

In some embodiments, the transmission power limit may be set to one of: the reference power level, a first maximum transmission power for a resource where the transmission occurs; a second maximum transmission power for a power class associated with the second terminal device; and a third maximum transmission power obtained by subtracting, from the first maximum transmission power or the second maximum transmission power, a transmission power reserved for a uplink transmission from the second terminal device to a base station to be performed simultaneously with the transmission from the second terminal device to the first terminal device. In some embodiments, the uplink transmission may include one or more of: a physical uplink control channel (PUCCH) transmission, and a physical uplink shared channel (PUSCH) transmission.

In some embodiments, the transmission power limit may be set to one of the first maximum transmission power, the second maximum transmission power and the third maximum transmission power, if a QoS level of the transmission is higher than a threshold; and the transmission power limit may be set to the reference power level, if the QoS level of the transmission is lower than the threshold.

In some embodiments, the transmission power limit may be set to one of the first maximum transmission power, the second maximum transmission power and the third maximum transmission power, if the second terminal device is out of a coverage of a base station; and set to the reference power level, if the second terminal device is in the coverage of the base station.

In some embodiments, performing the transmission to the first terminal device according to the determined transmission power may comprise: determining whether a total transmission power of the transmission and a further transmission to be performed simultaneously with the transmission exceeds a power threshold; in response to the total transmission power exceeding the power threshold, reducing the determined transmission power for the transmission; and performing the transmission to the first terminal device according to the reduced transmission power.

In some embodiments, performing the transmission to the first terminal device according to the determined transmission power may comprise: determining whether a total transmission power of the transmission and a further transmission to be performed simultaneously with the transmission exceeds a power threshold; in response to the total transmission power exceeding the power threshold, canceling the transmission to the first terminal device.

In some embodiments, the method may further comprise: reporting a power headroom (PHR) for at least one of an uplink transmission and a sidelink transmission to a base station.

In a third aspect of the present disclosure, there is provided a terminal device. The terminal device comprises at least one processor; and at least one memory including computer program codes; the at least one memory and the computer program codes are configured to, with the at least one processor, cause the terminal device at least to at least to perform the method of the first or second aspect of the present disclosure.

In a fourth aspect of the disclosure, there is provided a computer program. The computer program comprises instructions which, when executed by an apparatus, causes the apparatus to carry out the method according to the first or second aspect of the present disclosure.

In a fifth aspect of the disclosure, there is provided a computer readable medium with a computer program stored thereon which, when executed by an apparatus, causes the apparatus to carry out the method of the first or second aspect of the present disclosure.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Hereinafter, the principle and spirit of the present disclosure will be described with reference to illustrative embodiments. It should be understood that all these embodiments are given merely for one skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used herein, the term "wireless communication network" refers to a network following any suitable wireless communication standards, such as New Radio (NR), Long Term Evolution (LTE), LTE-Advanced (LTE-A), Wideband Code Division Multiple Access (WCDMA), High-Speed Packet Access (HSPA), and so on. The "wireless communication network" may also be referred to as a "wireless communication system." Furthermore, communications between network devices, between a network device and a terminal device, or between terminal devices in the wireless communication network may be performed according to any suitable communication protocol, including, but not limited to, Global System for Mobile Communications (GSM), Universal Mobile Telecommunications System (UMTS), Long Term Evolution (LTE), New Radio (NR), wireless local area network (WLAN) standards, such as the IEEE 802.11 standards, and/or any other appropriate wireless communication standard either currently known or to be developed in the future.

As used herein, the term "network device" refers to a node in a wireless communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communications. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "communication device", "terminal", "user equipment" and "UE" may be used interchangeably.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation. In some example embodiments, a terminal device may be a device to device (D2D) communication device, or a V2X device.

Figure 1:
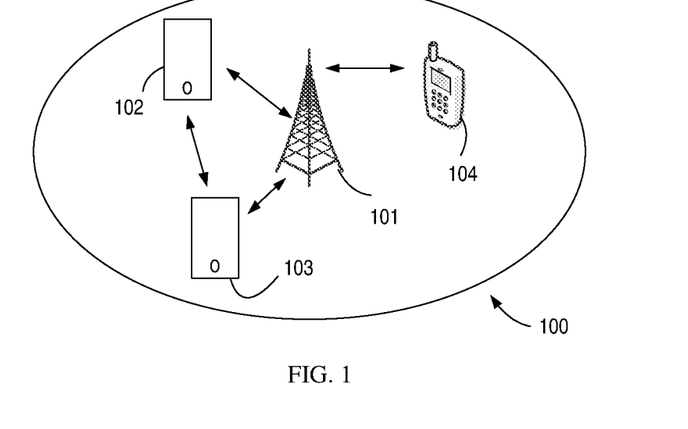
FIG. 1 illustrates an example communication network in which embodiments of the present disclosure may be implemented.

FIG. 1 illustrates an example wireless communication network 100 in which embodiments of the present disclosure may be implemented. As shown, the wireless communication network 100 may include one or more network devices, for example, network device 101. The network device 101 may be in a form of a base station (BS), a Node B (NB), an evolved NB (eNB), a gNB, a virtual BS, a Base Transceiver Station (BTS), or a Base Station Subsystem (BSS), AP and the like.

In this example, network device 101 provides radio connectivity to a set of UEs 102, 103, and 104. It should be appreciated that in some embodiments, the network device 102 may provide service to less or more UEs and the number of UEs shown in this example does not suggest any limitations as to the scope of the present disclosure.

A terminal device (e.g., terminal device 102) may access the wireless communication network via the network device 101, or communicate with another terminal device (e.g., terminal device 103 or 104) directly via D2D or V2X. As used herein, a downlink (DL) transmission refers to a transmission from a network device to UE, an uplink (UL) transmission refers to a transmission in an opposite direction, and sidelink (SL) transmission refers to V2X transmission between terminal devices.

V2X SL was defined in LTE Release 14 and further enhanced in LTE Rel-15. A NR V2X system may be required to support both unicast and group cast communication, and therefore effective power control on sidelink is necessary to enable reliable reception and minimized interference among different UEs.

In LTE V2X, an open loop power control mechanism is supported, where a terminal device adjusts its sidelink transmission power according to power control parameters configured by an eNB and an estimated pathloss (PL) between the terminal device and the eNB. Additionally, in a Rel-12 D2D system, a simplified close loop power control mechanism is adopted, in which an one-bit power control command transmitted from an eNB to a terminal device may indicate whether a maximum transmission power or a transmission power calculated according to the open loop power control mechanism should be adopted by the terminal device.

Inventors of the present disclosure have observed that in conventional power control mechanisms, including the power control mechanisms for LTE V2X and D2D, a transmission power of a device is controlled by a base station based on a pathloss between the device and the base station, aiming at reducing interference to cellular uplink transmissions. Such power control mechanisms have not taken link budget of a sidelink into consideration, and cannot provide optimal sidelink transmission efficiency, especially for sidelink unicast. It means that an efficient power control mechanism for NR V2X is still unavailable.

In the present disclosure, new power control mechanisms for sidelink are proposed. In some embodiments, transmission power of a transmitting device may be controlled by a corresponding receiving device, in order to optimize efficiency of a sidelink transmission. In other words, a power controlling device and a power controlled device may be involved in the proposed power control mechanisms. The power controlling device refers to a device which controls/configures transmission power of a transmission from another device, while the power controlled device refers to a device which performs the transmission according to one or more power control parameters from the power controlling device. That is, the power controlling device may be a receiving device of a transmission, while the power controlled device may be a transmitting device of the transmission. For example, terminal devices 102 and 103 in FIG. 1 may be involved in a V2X communication in which terminal device 102 transmits data to the terminal device 103, and the transmission power of terminal device 102 is determined based on power control parameters from the terminal device 103. In this example, the terminal device 102 is referred to as a power controlled device, while terminal device 103 is referred to as a power controlling device.

In the present disclosure, solutions are provided for determining one or more power control parameters (PCPs) and/or a transmission power control (TPC) command at the power controlling device side. The PCPs may be used for indicating a basic open-loop power control operating point, while the TPC command may be used for indicating a dynamic power offset. In addition, solutions for determining a transmission power at the power controlled device side based on the PCPs from the power controlling device are also proposed in the present disclosure. The proposed power control solutions can support, for example but not limited to, transmission power control for sidelink unicast.

In some embodiments, a power controlling device determines one or more PCPs and a TPC command (which may include a power offset δ) for a power controlled device based on measurements on transmissions from the power controlled UE and a specific reception power target.

Alternatively or in addition, in some embodiments, the power controlled device determines its transmission power for a transmission following a Type 1 TPC based on (pre-)configured open loop power control parameters, and determines the transmission power for a transmission following a Type 2 TPC based on the PCP(s) and/or TPC command provided by the power controlling UE.

Figure 2:
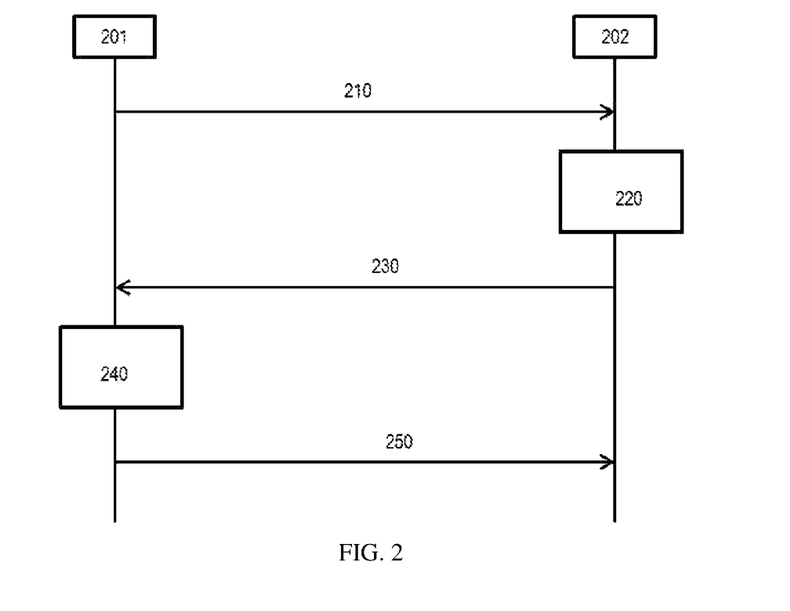
FIG. 2 shows a power control procedure according to an example embodiment of the present disclosure.

FIG. 2 shows a power control procedure 200 according to an example embodiment of the present disclosure. As shown in FIG. 2, a power controlled UE 201 may perform (210) a transmission to a power controlling UE 202 following a Type 1 TPC. Based on the received transmission, the power controlling UE 202 may determine (220) PCP(s) and/or a TPC command for the power controlled UE 201, and provides (230) the PCP(s) and/or TPC command to the power controlled UE 201. Based on the received PCP(s) and/or TPC command, the power controlled UE 201 may determine (240) its transmission power for a transmission following a Type 2 TPC, and perform (250) the transmission to the power controlling UE 202 based on the determined transmission power.

Embodiments are not limited to any specific way for providing the PCP(s) and/or TPC command to the power controlled UE 201. For example rather than limitation, the PCP may be transmitted by the power controlling UE 202 to the power controlled UE 201 via a sidelink control channel or a sidelink data channel. Alternatively, in some embodiments, the PCP(s) and/or TPC command may be forwarded to the power controlled UE 201 by a base station.

In some embodiments, the PCP(s) transmitted from the power controlling UE 202 to the power controlled UE 201 may include a power adjustment (PA) value relative to a transmission power for a transmission using Type 1 TPC of the power controlled device. The transmission power for the transmission using Type 1 TPC may be determined by the power controlled UE 201 according to power control parameters configured by a bases station and/or an estimated PL with respect to the base station. Before the power controlling UE 202 providing the PCP to the power controlled UE 202, it may assume that all transmissions received from the power controlled UE 201 are transmissions using Type 1 TPC. As an example rather than limitation, the transmission using Type 1 TPC may be performed in a broadcasting manner.

The power adjustment value (PA) to be transmitted to a power controlled device may be determined by the power controlling device based on one or more recently received transmissions using Type 1 TPC from the power controlled device. The number of transmissions using Type 1 TPC, received from the power controlled device, for determining the PA may be denoted as R1 hereafter, and a value of R1 may be predefined, (pre-)configured, or determined by the power controlling device. In some embodiments, the value of R1 may be set to 1.

In some embodiments, the power controlling device (e.g., terminal device 103 in FIG. 1, or power controlling UE 202 in FIG. 2) may determine the PA for the power controlled device (e.g., terminal device 102 in FIG. 1, or power controlled UE 201 in FIG. 2) by comparing a measured performance metric to a target performance metric. The performance metric may include, but is not limited to, a receiving SINR.

For example, the he power controlling device may determine the PA for the power controlled device via formula (1) below.

$$PA = SINR\_T - SINR\_R, \quad (1)$$

where SINR_T stands for a targeted receiving SINR, and a value of SINR_T may be specified or (pre-) configured. SINR_R stands for a measured receiving SINR which may be obtained by averaging over R1 received transmissions.

As an example, SINR_R may be obtained based on formula (2).

$$SINR\_R = 10\log 10\left(\frac{\sum_{i=0}^{R1-1} 10^{0.1 \times (SINR_i - \Delta_i)}}{R1}\right) \quad (2)$$

where $SINR_i$ stands for a linear average over the power contribution (in [W]) of resource elements (REs) carrying reference signal (RS) for SINR measurement divided by a linear average of the noise and interference power contribution (in [W]) over the resource elements carrying RS for SINR measurement for the ith received transmission of the R1 received transmissions. In formula (2), $\Delta_i$ stands for a power compensation for MCS and/or QoS for the ith received transmission.

For illustration rather than limitation, $\Delta i$ may be obtained via formula (3):

$$\Delta_i = 10 \log 10((2^{BPRE_i \cdot K_s} - 1) \cdot \beta_{QoS,i}). \quad (3)$$

where $K_s$ stands for a MCS compensation factor, which may be set to a non-zero value (e.g., $K_s = 1.25$) if compensation for MCS is enabled (e.g., by specification or (pre-)configuration), and set to 0 otherwise. In formula (3), $BPRE_i$ stands for the average number of bits conveyed per RE for the ith received transmission of the R1 received transmissions. In addition, $\beta_{QoS,i}$ stands for a QoS compensation factor for the ith reception, and it may be specified or (pre-)configured for QoS level of the ith of the R1 receptions if QoS compensation is enabled; otherwise, $\beta_{QoSi,i}$ may be omitted from Formula (3) or set to a fixed value of 1.

Alternatively, in some embodiments, the PCP provided by the power controlling device to the power controlled device may include a base power level P0 and/or a PL compensation ratio α. The value of P0 and/or a may be determined by the power controlling device itself based on a restriction of transmission power, or configured by a base station.

In some embodiments, the power controlling device may determine a value for P0 and/or α, so that a received power at the power controlling device is no larger than a target receiving signal power per physical resource block (PRB). For example, the value for P0 and/or α may be determined by considering the restriction condition defined in formula (4).

$$P0 + \alpha \cdot PLer \leq SINR\_T + No + 10 \log 10(N_{RE}^{PRB}) \quad (4)$$

where $N_{RE}^{PRB}$ stands for the number of REs per physical resource block (RPB), and $PL_{er}$ stands for an averaged pathloss between the power controlling device and the power controlled device. As an example without limitation, $PL_{er}$ may be obtained via Formula (5):

$$PL_{er} = 10\log 10\left(\frac{\sum_{i=0}^{R1-1} 10^{0.1 \times PL_{er,i}}}{R1}\right), \quad (5)$$

where $PL_{er,i}$ stands for a PL estimated by the power controlling device based the ith reception of the R1 receptions. To enable the estimation of PL by the power controlling device, the power controlled device may indicate a transmission power of the RS to the power controlling device. Alternatively, in some embodiments, the power controlled device may directly indicate a value of the $PL_{er}$ to the power controlling device, and in such embodiments, estimation of the PL is performed at the power controlled device side.

In addition, in formula (4), No stands for an averaged noise and interference level. For example, No may be obtained via formula (6).

$$No = 10\log 10\left(\frac{\sum_{i=0}^{R1-1} 10^{0.1 \times Noi} \times 2^{-\mu_i}}{R1}\right), \quad (6)$$

where Noi stands for a linear average of the noise and interference power contribution (in [W]) over REs carrying RS for the noise and interference estimation for the ith of the R1 receptions. $\mu_i$ stands for a normalization factor and may be numerology specific. For example, $\mu_i$ may be set to 0, 1, 2, 3 or 4 respectively for a subcarrier spacing of 15 kHz, 30 kHz, 60 kHz, 120 kHz or 240 kHz for the ith reception.

In some embodiments, the power control parameters, including PA, P0 and/or α provided by the power controlling device to the power controlled device, may be semi-static, and therefore to enable faster power control, the power controlling device may further indicate a dynamic power control factor (e.g., a power offset δ) to the power controlled device in addition to the power control parameters. Embodiments are not limited to any specific way for indicating δ to the power controlled device. Just for illustration, a value of δ may be transmitted to the power controlled device via a sidelink control channel or a sidelink data channel from the power controlling device directly, or forwarded to the power controlled device by a base station.

At the power controlling device side, the value of the δ to be transmitted to a power controlled device may be determined based on one or more recently received transmissions using Type 2 TPC from the power controlled device. In the present disclosure, a transmission using Type 2 TPC refers to a transmission with a transmission power determined based on one or more power control parameters configured by the power controlling device.

The number of received transmissions using Type 2 TPC for determining δ may be denoted as R2 hereafter. A value of R2 may be specified, (pre-)configured, or determined by the power controlling device. In some embodiments, the value of R2 may be set to 1.

As an example without limitation, the power controlling device (e.g., terminal device 103 in FIG. 1, or power controlling UE 202 in FIG. 2) may determine δ to be sent to the power controlled device (e.g., terminal device 102 in FIG. 1, or power controlled UE 201 in FIG. 2) based on a measured performance metric and a target performance metric. The performance metric may include, but is not limited to, a receiving SINR. For instance, the power controlling device may determine the value for δ, so that the condition/restriction defined in formula (7) is satisfied.

$$\text{SINR}\_R + \delta \le \text{SINR}\_T \quad (7)$$

In some embodiments, at the power controlled device side, before receiving the power control parameters (e.g., PA, P0 and/or α), it may perform a transmission following a Type 1 TPC, i.e., the power controlled device may determine its transmission power based on one or more power control parameters configured by a bases station, an estimated pathloss with respect to the base station, and/or a pre-configured power control parameter. For instance, if the power controlled device (e.g., terminal device 102 in FIG. 1) is in coverage of a base station (e.g., network device 101 in FIG. 1 which may be an eNB or gNB) on a carrier for a transmission using Type 1 TPC, the power for the transmission using Type 1 TPC may be determined by the power controlled device according to one or more power control parameters configured by the bases station and/or the estimated pathloss with respect to the base station. On the other hand, if the power controlled device is out of coverage of the base station on the carrier for the transmission using Type 1 TPC, the power for the transmission using Type 1 TPC may be determined by the power controlled device according to one or more pre-configured power control parameters.

Optionally, in some embodiments, when determining the power for the transmission using Type 1 TPC, the power controlled device may consider some further factors, which may include (but is not limited to) a QoS requirement of the transmission. For instance, a QoS compensation factor may be used for determining the transmission power of the transmission with Type 1 TPC, together with one or more power control parameters configured by the base station.

Once a power control parameter (PCP) configured by the power controlling device is available, the power controlled device performs transmissions following the Type 2 TPC, i.e., determines a transmission power of the transmission based on the PCP from the power controlling device.

For illustration purpose, some example embodiments for determining the transmission power for a transmission with Type 2 TPC at the power controlled device side will be provided below; however, it should be appreciated that the proposed solution is not limited to the specific examples.

In some embodiments, the PCP received by the power controlled device from the power controlling device may include a power adjustment value (PA) with respect to a transmission power of a transmission using Type 1 TPC. For example, PA may be determined by the power controlling device via formula (1). In such embodiments, the power controlled device in coverage of a base station on a carrier for a transmission using Type 2 TPC (which may be referred to as transmission T2 hereafter) may determine a transmission power for the transmission T2 based on at least one of: the transmission power determined according to Type 1 TPC, the PA received directly or indirectly from the power controlling device, and/or a power compensation value for MCS and/or QoS of the transmission T2.

As an example without limitation, the transmission power of the transmission T2 may be determined based on formula (8) below:

$$P2 = \min\{PM, 10 \log 10(M) + P1 + PA + \Delta\} \text{ [dBm]} \quad (8)$$

where PM stands for transmission power limit for the transmission T2, M stands for the number of PRBs to be used for the transmission T2, P1 stands for a per-PRB transmission power determined according to Type 1 TPC for the transmission T2, and Δ stands for a compensation factor associated with MCS and/or QoS of the transmission T2.

Embodiments are not limited to any specific value or expression for the transmission power limit PM used in formula (8). As an example rather than limitation, PM may be determined according to Type 1 TPC for the transmission T2, e.g., $$PM = 10 \log 10(M) + P1 \quad (9)$$

Where M stands for the number of PRBs to be used for the transmission T2, and P1 stands for a per-PRB transmission power determined according to Type 1 TPC for the transmission T2.

Alternatively, the PM in formula (8) may be set to the maximum allowed power for sidelink transmission. For example, PM may be determined as:

$$PM = P_{CMAX}, \quad (10)$$

where $P_{CMAX}$ is the (pre-)configured maximum transmission power for a carrier and a time slot where the transmission T2 occurs. As another example, PM may be determined as:

$$PM = P_{TMAX}, \quad (11)$$

where $P_{TMAX}$ is a specified or predefined maximum transmission power for a power class of the power controlled device.

In some embodiments, the power controlled device (e.g., terminal device 102 in FIG. 1) may perform an UL transmission (e.g., a physical uplink control channel (PUCCH) transmission, and/or a physical uplink shared channel (PUSCH) transmission) to a base station (e.g., network device 101 in FIG. 1) simultaneously with the transmission T2 to the power controlling device (e.g., terminal device 103 in FIG. 1). In such embodiments, the power controlled device may determine the value for the PM in formula (8) by reserving transmission power for the UL transmission. For example, the PM may be determined based on formula (10) or (11):

$$PM = P_{CMAX} - P_{UL}, \quad (12)$$

$$PM = P_{TMAX} - P_{UL} \quad (13)$$

where $P_{UL}$ stands for the UL transmission (e.g., PUCCH and/or PUSCH transmission) power in a slot where the transmission T2 occurs, or the PUCCCH and the PUSCH transmission power in the slot where the transmission T2 occurs.

In some further embodiments, the value of PM in formula (8) may depend on QoS level and/or priority of the transmission T2. As a non-limiting example, the power controlled device in coverage on a carrier for the transmission T2 may determine the value for PM according to any of formulas (10)-(13) if the QoS level of the transmission T2 is higher than a configured threshold; otherwise, the value for PM may be determined according to formula (9).

The formula (8) may be used for determining the transmission power for a transmission T2, for example, when a dynamic power control command (e.g., a power offset δ) from the power controlling device is still unavailable. For example, the power controlled device may determine the first transmission T2 based on formula (8) after receiving a semi-static PCP from the power controlling device.

When the dynamic power control command (which may include a power offset δ) from the power controlling device is received by the power controlled device (directly or indirectly), it may be used by the power controlled device for determining the transmission power for the transmission T2 more accurately. In some embodiments, the transmission power for the transmission T2 may be determined based on at least one of: the received TPC command, the average transmission power of recent transmissions using Type 2 TPC, and a power compensation value for MCS and/or QoS. As a non-limiting example, the power controlled device may determine the transmission power for the transmission T2 via formula (14):

$$P2 = \min\{PM, 10 \log 10(2^\mu \cdot M) + Pr + \Delta + \delta\} [dBm] \quad (14)$$

where PM, M and $\Delta$ have same meaning as that in formula (8), and a value for the PM may be determined in a similar way to that described above based on one of formula (9) to (13). Alternatively or in addition, in some embodiments, the value of PM in formula (14) may be determined based on any of formulas (10)-(13) if the power controlled device is out of coverage of the base station, which means that P1 in formula (9) (i.e., per-PRB transmission power determined according to Type 1 TPC) is unavailable.

In addition, $\delta$ in formula (14) stands for the power offset indicated by the power control command corresponding to the transmission T2 received from the power controlling device, and Pr stands for a per-PRB transmission power averaged over R2 transmissions. For instance, Pr may be obtained via formula (15):

$$Pr = 10 \log 10 \left( \frac{\sum_{i=0}^{R2-1} 10^{0.1 \times (Pr_i - \Delta_i)} \times 2^{-\mu_i}}{R2} \right), \quad (15)$$

where $Pr_i$ is the average per-PRB transmission power of the ith transmission of the R2 recent transmissions using Type 2 TPC, and $\Delta_i$ stands for a compensation factor associated with MCS and/or QoS for the ith transmission. By subtracting $\Delta_i$ from $Pr_i$ (i.e., $Pr_i - \Delta_i$), a per-PRB transmission power without compensation for the ith transmission is obtained. $\mu_1$ in formula (15) stands for a normalization factor associated with numerology of the ith transmission.

In some embodiments, the PCP received by the power controlled device from the power controlling device may include a base power level P0 and/or a PL compensation ratio $\alpha$ which may be determined by the power controlling device based on, for example, formula (4). In such embodiments, the power controlling device in coverage on a carrier for the transmission using Type 2 TPC (i.e., transmission T2) may determine a transmission power for the transmission T2 based on the base power level P0 and/or a from the power controlling device, and optionally one or more of: a TPC command from the power controlling device, and a power compensation value for MCS and/or QoS. As a non-limiting example, the power controlled device may determine the transmission power for the transmission T2 via formula (16).

$$P2 = \min\{PM, 10 \log 10(2^\mu \cdot M) + P0 + \alpha \cdot PL_{ed} + \Delta + f + \delta\} \quad (16)$$

where PM stands for a transmission power limit, M stands for the number of PRBs used for the transmission T2, $2^\mu$ stands for a normalization factor for different numerologies, P0 and $\alpha$ stand for a base power level and a PL compensation ratio received from the power controlling device. The item of $PL_{ed}$ in formula (16) stands for an estimated PL between the power controlled device and the power controlling device. In addition, $\Delta$ stands for a compensation factor associated with MCs and/or Qos of the transmission T2, $\delta$ stands for a power offset receive from the power controlling device, and f stands for an accumulated adjustment factor, which may be obtained by accumulating all $\delta$ received from the power controlling device since last accumulation reset/initialization slot.

Similar to that described with reference to formula (8), a value for the PM in formula (16) may be determined via any of formulas (9) to (13). In some further embodiments, the value of PM in formula (16) may depend on QoS level and/or priority of the transmission T2. As a non-limiting example, the power controlling device in coverage of a base station on a carrier for the transmission T2 may determine the value for PM according to any of formulas (10)-(13) if the QoS level of the transmission T2 is higher than a configured threshold; otherwise, the value for PM may be determined according to formula (9). Alternatively or in addition, in some embodiments, the value of PM in formula (16) may be determined based on one of formulas (10)-(13) if the power controlled device is out of coverage of the base station.

In some embodiments, a value for the $PL_{ed}$ in formula (16) may be received by the power controlled device from the power controlling device. Alternatively, in another embodiment, the value for $PL_{ed}$ may be determined by the power controlled device based on measurements of one or more transmissions (e.g., RS transmissions) from the power controlling device. The number of transmissions used for the measurements may be denoted as R3 hereafter for simplicity. A value for R3 may be determined by the power controlled device or power controlling device, or specified or (pre-)configured. A transmission power of the R3 transmissions (e.g., RS transmissions) from the power controlling device may be informed to the power controlled device to enable the measurement of PL.

As an example, the value for $PL_{ed}$ may be determined by the power controlled device via formula (17).

$$PLed = 10 \log 10 \left( \frac{\sum_{i=0}^{R3-1} 10^{0.1 \times PL_{ed,i}}}{R3} \right) \quad (17)$$

where $PL_{ed,i}$ stands for a pathloss estimated based the ith transmission of the R3 transmissions from the power controlling device.

It should be appreciated that some items in formula (16) may be omitted in some embodiments. For example, the items $\delta$ and f may be omitted if dynamic power control command from the power controlling device in unavailable. Alternatively, f may be omitted or set to zero, if an accumulative TPC command is not enabled. In some embodiments, the power controlled device may not take compensation associated with MCS or QoS into consideration during determination of the transmission power for the transmission T2, and in such a case, the item of $\Delta$ may be omitted from formula (16).

In some embodiments, the power controlled device may have a plurality of physical channels/signals to be transmitted in a slot where the transmission T2 occurs, and the sum of the transmission power required for all these physical channels/signals may exceed the maximum transmission power allowed for the power controlled device. In such a case, the power controlled device may scale down the transmission power for one or more of the plurality of physical channels/signals, so that the sum of the transmission power of the plurality of physical channels/signals does not exceed the maximum transmission power. For example, the power controlled device may scale down transmission power P2 of the transmission T2 for side link, drop the transmission T2 directly, or drop the transmission T2 when the transmission power after the scaling is lower than a predetermined threshold. In some embodiments, the power controlled device may determine a physical channel/signal to be scaled down or drop based on priority of the plurality of the physical channels/signals.

Alternatively or in addition, in some embodiments, a transmission using Type 2 TPC may be scheduled by a base station, and the power controlled device may report a power headroom (PHR) to the base station to facilitate the scheduling. The PHR may include transmission power for UL and/or sidelink.

To facilitate better understanding of the present disclosure, some further embodiments will be provided below with reference to FIGS. 3-9.

Figure 3:
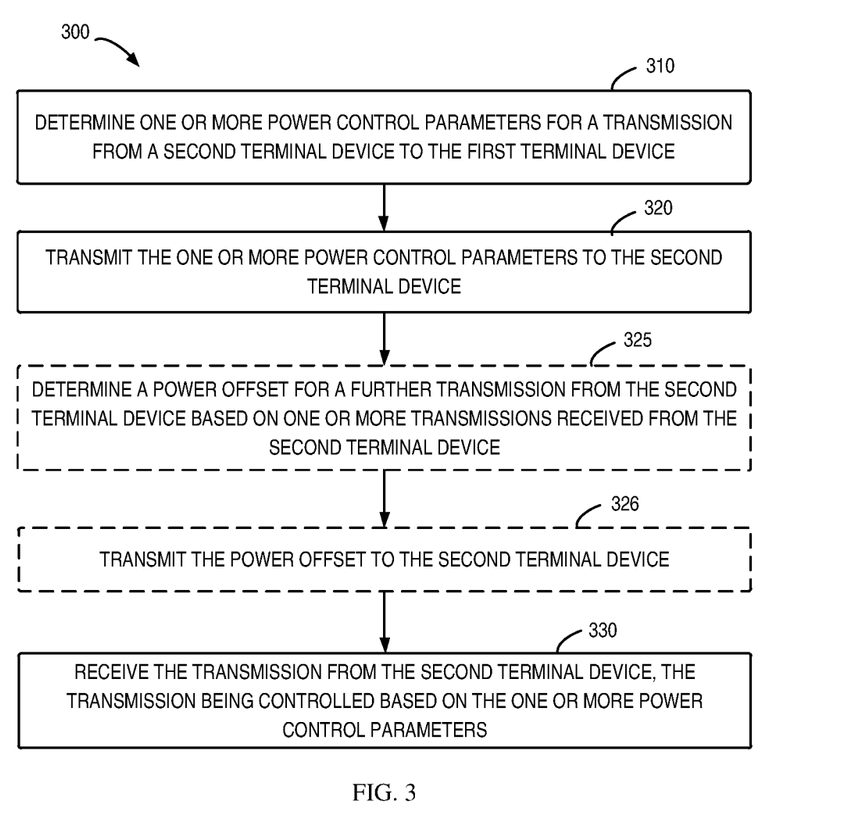
FIG. 3 shows operations of an example method for power control according to an embodiment of the present disclosure.

FIG. 3 shows operations of an example method 300 according to an embodiment of the present disclosure, which may be performed by a terminal device, for example, any of the terminal devices 102-104 in FIG. 1 or the power controlling UE 202 in FIG. 2. Just for illustration purpose, the method 300 will be described below with reference to the terminal device 103 and the communication network 100 illustrated in FIG. 1; however, it should be appreciated that embodiments of the present disclosure are not limited thereto.

As shown in FIG. 3, at block 310, the terminal device 103 (which may be referred to as the first device) determines one or more power control parameters for a transmission from a second terminal device, e.g., terminal device 102 in FIG. 1, to the terminal device 103. In other words, the terminal device 103 determines one or more power control parameters for a sidelink transmission between the terminal device 102 and the terminal device 103.

The one or more power control parameters (PCPs) may include at least one of: a power adjustment value (PA) relative to a reference power level, a base power level, and a pathloss compensation factor. For example, in some embodiments, the PCP(s) may include a power adjustment (PA) value relative to a transmission power for a transmission using Type 1 TPC of the power controlled UE. The transmission power for the transmission following/using Type 1 TPC may be determined by the power controlled device based on one or more of: a power control parameter configured by a base station or preconfigured, a pathloss between the second terminal device and the base station, and a power compensation associated with a MCS and/or a QoS level of the transmission.

In some embodiments, the terminal device 103 may determine the PA value by comparing a measured performance metric to a target performance metric. The performance metric may include, but not limited to, a receiving SINR. As an example rather than limitation, the PA may be determined based on formula (1) described above. In this example, the terminal device 103 may further determine an averaged receiving SINR based on one or more transmissions from the terminal device 102 to obtain the measured receiving SINR. The one or more transmissions for the measurement are transmitted with Type 1 TPC. That is, the transmission power for the one or more transmissions for the measurement is determined based on at least one of: a power control parameter configured by a base station or preconfigured, a pathloss between the second terminal device and the base station, and a power compensation associated with a MCS and/or a QoS level of the transmission.

In some embodiments, the averaged receiving SINR may be determined by the terminal device 103 based on formual (2). For example, the terminal device 103 may obtain an estimated receiving SINR for each of the one or more transmissions, and determine an averaged value of the estimated receiving SINRs as the averaged receiving SINR.

When obtaining the estimated receiving SINR for each of the one or more transmissions, the terminal device 103 may remove power compensation $\Delta_i$ associated with the MCS and/or QoS level for each of the one or more transmissions. In the example shown in formula (2), $\Delta i$ is removed from $SINR_i$ when calculating SINR_R. $\Delta i$ may be determined, for example, based on formula (3).

Alternatively or in addition, the one or more PCPs determined by the terminal device 103 at block 310 may include a base power level P0 and a pathloss compensation factor $\alpha$, and the terminal device 103 may determine the P0 and $\alpha$ based on a target receiving SINR (referred to as SINR_T) and a pathloss between the first terminal device and the second terminal device (referred to as $PL_{er}$). As an example rather than limitation, the terminal device 103 may determine the P0 and $\alpha$, such that a receiving power at the terminal device 103 is no larger than the target receiving power SINR_T. In particular, the terminal device 103 may determine the P0 and a to satisfy a restriction defined in formula (4).

At block 320, the terminal device 103 transmits the one or more power control parameters to the terminal device 102. It should be appreciated that embodiments are not limited to any specific way for transmitting the PCPs to the terminal device 102. As examples rather than limitations, the PCPs may be signaled to the terminal device 102 via a sidelink between the terminal device 103 and the terminal device 102 directly, or, forwarded to the terminal device via a base station (e.g., the network device 101 in FIG. 1).

At block 330, the terminal device 103 receives the transmission from the terminal device 102 and the received transmission is performed based on the one or more PCPs. For example, the received transmission may have a transmission power determined based on formula (8).

Optionally, in some embodiments, to enable faster power control, the terminal device 103 may further determine, at block 325, a power offset (which may be referred to as $\delta$) for a transmission from the terminal device 102, and transmit the power offset to the terminal device 102 at block 326. The $\delta$ may be determined based on one or more transmissions with a Type 2 TPC received from the terminal device 102, i.e., the transmission power of the one or more transmissions is determined based on the PCPs from the terminal device 103.

As a non-limiting embodiment, the terminal device 103 may determine $\delta$ based on formula (7). The power offset $\delta$ enables the terminal device 102 to determine the transmission power more efficiently, for example based on formula (14) or (16).

It should be appreciated that all descriptions provided above with reference to formula (1)-(17) also apply to method 300, and therefore details will not be repeated.

Figure 4:
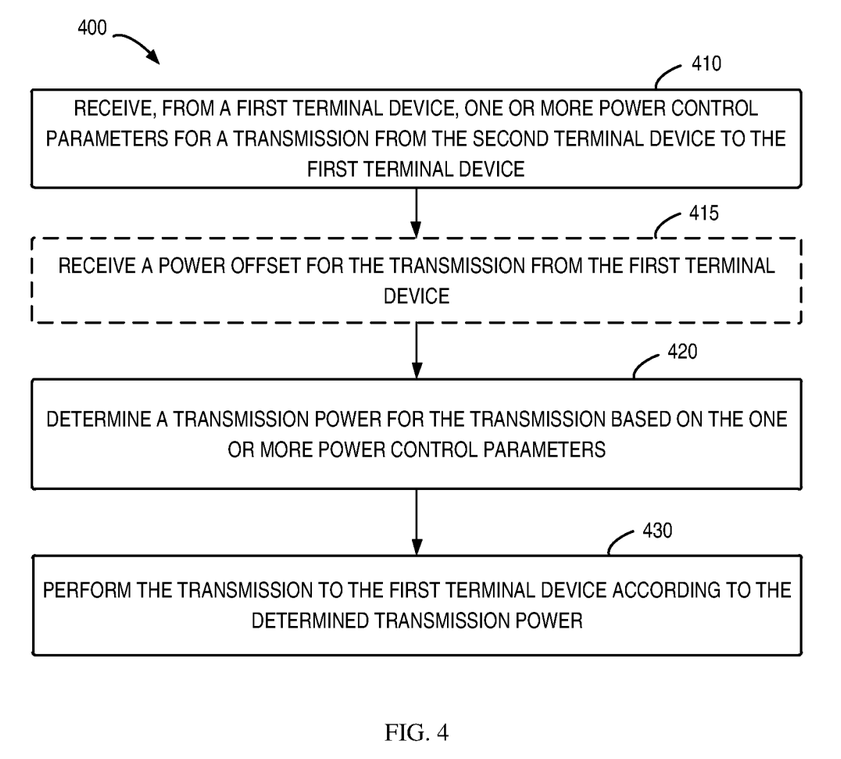
FIG. 4 shows operations of another method for determining transmission power according to an embodiment of the present disclosure.

FIG. 4 shows operations of another method 400 according to an embodiment of the present disclosure. The method 400 may be implemented by a terminal device, for example, any of the terminal devices 102-104 in FIG. 1 or the power controlled UE 201 in FIG. 2. Just for illustration purpose, the method 400 will be described below with reference to the terminal device 102 and the communication network 100 illustrated in FIG. 1; however, it should be appreciated that embodiments of the present disclosure are not limited thereto.

As shown in FIG. 4, at block 410, terminal device 102 receives, from a terminal device 103, one or more PCPs for a transmission from the terminal device 102 to the terminal device 103. This is different from a conventional solution where a terminal device only receives power control related configuration from a base station.

The PCPs received by the terminal device 102 may include one or more of: a PA value relative to a reference power level, a base power level P0, and a pathloss compensation factor $\alpha$. As a non-limiting example, the reference power level may include a transmission power determined with a Type 1 TPC, i.e., the reference transmission power may be determined based on one or more of: a power control parameter configured by a base station (e.g., the network device 101 in FIG. 1) or preconfigured, a pathloss between the terminal device 102 and the base station, and a power compensation associated with a MCS and/or a QoS level of the transmission.

Descriptions related to PCPs (including determination of the PCPs) provided above with reference to method 300 also apply here, and therefore details will not be repeated.

At block 420, the terminal device 102 determines a transmission power for the transmission based on the received one or more PCPs.

Figure 5:
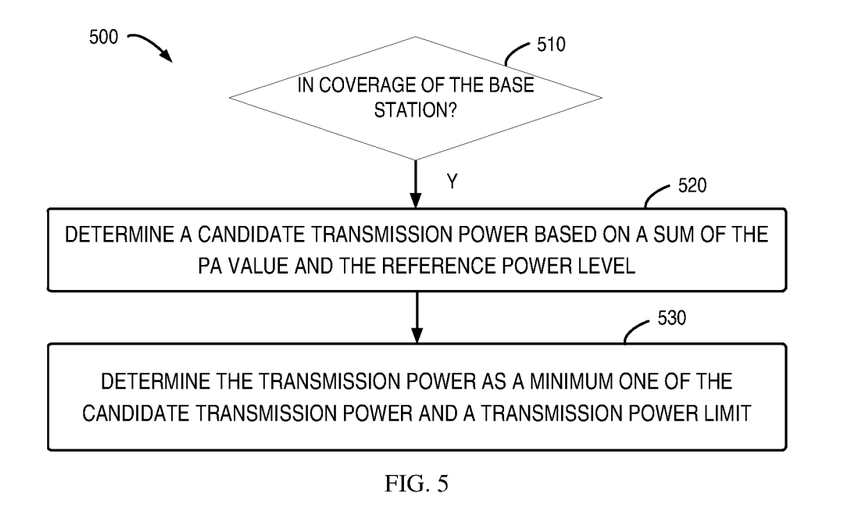
FIGS. 5-8 show example operations for determining transmission power according to embodiments of the present disclosure.

In some embodiments, the received PCPs may include the PA value relative to the reference power level, and at block 420, the terminal device 102 may determine the transmission power via operations 500 shown in FIG. 5.

In the example of FIG. 5, the terminal device 102 may optionally determine whether it is in a coverage of a base station (e.g., the network device 101 in FIG. 1) at block 510. If the terminal device 102 is in the coverage, it may determine a candidate transmission power based on a sum of the PA value and the reference power level at block 520; and determines the transmission power as a minimum one of the candidate transmission power and a transmission power limit at block 530. It should be appreciated that, in some embodiments, the terminal device 102 may perform the operations of blocks 520 and 530 regardless of whether it is in the coverage of the base station, i.e., the determination operation of block 510 may be omitted.

As an example, the terminal device 102 may determine the transmission power according to formula (8), where the candidate transmission power may be obtained as $10 \log 10(M)+P1+PA+\Delta$, and the transmission power limit PM may be determined based on any of formula (9)-(13).

Now refer back to FIG. 4. In some embodiments, the terminal device 102 may further receive a power offset $\delta$ for the transmission from the terminal device 103 at block 415. In such cases, the terminal device 103 may determine the transmission power further based on the power offset $\delta$. For example, the terminal device 102 may determine the transmission power via operations 600 shown in FIG. 6.

Figure 6:
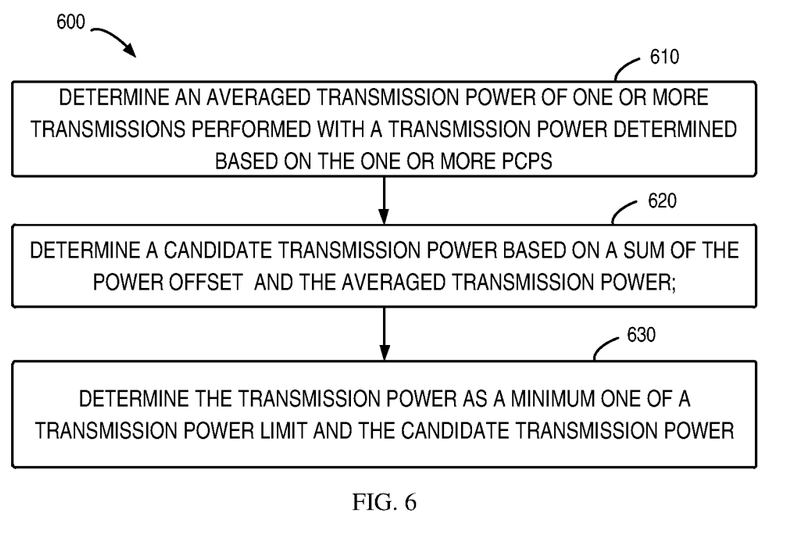

In the example of FIG. 6, at block 610, the terminal device 102 may determine an averaged transmission power of one or more transmissions performed with a transmission power determined based on the one or more PCPs, i.e., determine an averaged transmission power of one or more transmissions with Type 2 TPC. As a non-limiting example, the averaged transmission power may be determined via formula (15).

At block 620, the terminal device 102 determines a candidate transmission power based on a sum of the power offset $\delta$ and the averaged transmission power. For example, the candidate transmission power may be determined as $10 \log 10(2^\mu \cdot M)+Pr$, $10 \log 10(2^\mu \cdot M)+Pr+\Delta$, or $10 \log 10(2^\mu \cdot M)+Pr+\Delta+\delta$. Here M, $\Delta$ and $\delta$ have same meaning as previously defined.

At block 630, terminal device 102 determines the transmission power as a minimum one of a transmission power limit and the candidate transmission power. As an example rather than limitation, the terminal device 102 may determine the transmission power based on formula (14). The transmission power limit may be determined in various ways as described with reference to formulae (8)-(16).

Figure 7:
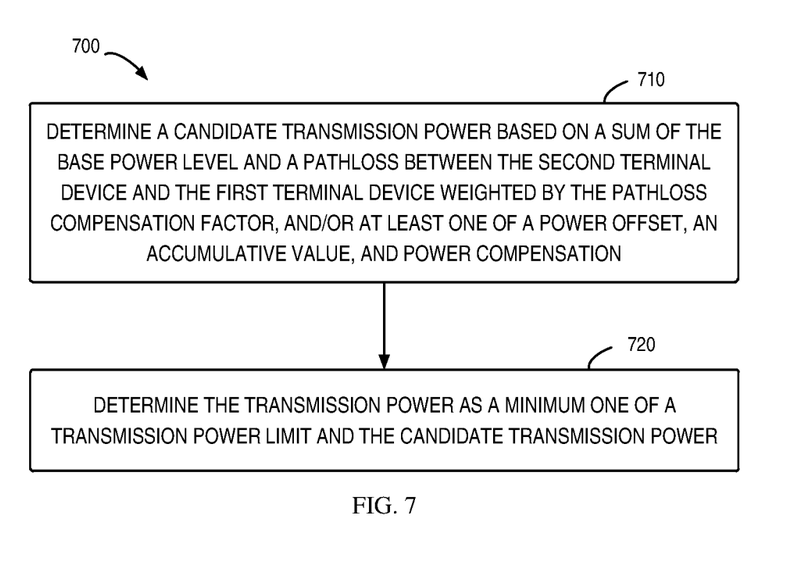

In some embodiments, the PCPs received by the terminal device 102 may include the base power level P0 and the pathloss compensation factor $\alpha$, and in such embodiments, at block 420 of FIG. 4, the terminal device 102 may determine the transmission power based on operations 700 shown in FIG. 7.

In the example of FIG. 7, at block 710, the terminal device 102 may determine a candidate transmission power based on a sum of the base power level P0 and a pathloss $PL_{ed}$ between the terminal device 102 and the terminal device 103 weighted by the pathloss compensation factor $\alpha$, and at block 720. For example, the candidate transmission power may be determined as $10 \log 10(2^\mu \cdot M)+P0+\alpha \cdot PL_{ed}$, where M stands for the number of PRBs used for the transmission and $2^\mu$ stands for a normalization factor for different numerologies.

In some embodiments where the terminal device 102 further receives a power offset $\delta$ for the transmission from the terminal device 103 at block 415, the candidate transmission power may be determined further based on the power offset $\delta$.

Alternatively or in addition, the terminal device 102 may determine the candidate transmission power based on an accumulative value f of previous power offsets $\delta$ received from the terminal device 103, and/or a power compensation $\Delta$ associated with a MCS and/or a QoS level of the transmission.

At block 720, terminal device 102 determines the transmission power as a minimum one of a transmission power limit and the candidate transmission power. As a non-limiting example, the terminal device 102 may determine the transmission power P2 according to formula (16).

The transmission power limit PM for determining the transmission power (e.g., at block 530 in FIG. 5, block 630 in FIG. 6, or block 720 in FIG. 7) may be set to one of: the reference power level, a first maximum transmission power for a resource where the transmission occurs; a second maximum transmission power for a power class associated with the terminal device 102; and a third maximum transmission power obtained by subtracting, from the first maximum transmission power or the second maximum transmission power, a transmission power reserved for a uplink transmission (e.g., PUCCH and/or PUSCH) from the terminal device 102 to a base station (e.g., the network device 101 in FIG. 1) to be performed simultaneously with the transmission from the terminal device 102 to the terminal device 103. As an example rather than limitation, the transmission power limit PM may be determined based on any of formula (9)-(13).

Alternatively, the transmission power limit PM may depend on the QoS level of the transmission of terminal device 102. For example, if the QoS level of the transmission is higher than a threshold, the transmission power limit PM may be set to one of the first maximum transmission power (e.g $P_{CMAX}$ in formula (10)), the second maximum transmission power (e.g., $P_{TMAX}$ in formula (11)) and the third maximum transmission power (e.g., $P_{CMAX}-P_{UL}$ or $P_{TMAX}-P_{UL}$ in formula (12) or (13)). If the QoS level of the transmission is lower than a threshold, the transmission power limit may be set to the reference power level, e.g., 10 log 10(M)+P1 in formula (9).

In another embodiment, the transmission power limit PM for determining the transmission power may depends on whether terminal device 102 is in a coverage of a base station (e.g., network device 101 in FIG. 1). For example, if the terminal device 102 is out of a coverage of the base station, the transmission power limit may be set to one of the first maximum transmission power (e.g., $P_{CMAX}$ in formula (10)), the second maximum transmission power (e.g., $P_{TMAX}$ in formula (11)) and the third maximum transmission power (e.g., $P_{CMAX}-P_{UL}$ or $P_{TMAX}-P_{UL}$ in formula (12) or (13)). On the other hand, if the terminal device 102 is in the coverage of the base station, the transmission power limit may be set to the reference power level e.g., 10 log 10(M)+P1 in formula (9).

Now refer back to FIG. 4. At block 430, the terminal device 102 performs the transmission to the terminal device 103 according to the determined transmission power. For example, the terminal device 102 may perform the transmission with a transmission power P2 determined according to any of formula (8), (14) or (16).

In some embodiments, the terminal device 102 may keep a connection with the network device 101 or another terminal device 104, and in such embodiments, the terminal device 102 may have to transmit at least one further transmission simultaneously with the transmission to the terminal device 103. In such embodiments, at block 430, the terminal device 102 may perform the transmission to the terminal device 103 based on operations 800 shown in FIG. 8.

Figure 8:
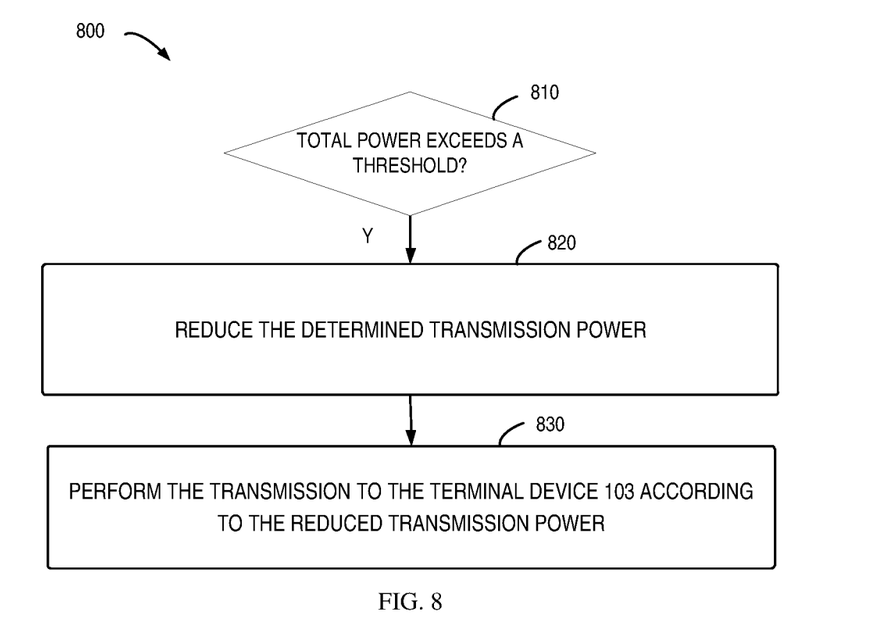

In the example of FIG. 8, at block 810, the terminal device 102 determines whether a total transmission power of the transmission to the terminal device 103 and a further transmission to be performed simultaneously with the transmission exceeds a power threshold. At block 820, if the total transmission power exceeds the power threshold, the terminal device 102 reduces the determined transmission power for the transmission to the terminal device 103. That is, a reduced transmission power P2' smaller than the determined transmission power P2 is obtained. At block 830, the terminal device 102 performs the transmission to the terminal device 103 according to the reduced transmission power P2'. Note that, if the total transmission power does not exceed the power threshold, the terminal device 102 does not need to scale down the determined transmission power P2.

In some embodiments, if the total transmission power exceeds the power threshold, the terminal device 102 may drop (i.e., cancel) the transmission to the terminal device 103 directly. Alternatively, in another embodiment, the terminal device 102 may determine whether the reduced transmission power P2' obtained at block 820 is below a threshold. If so, it means that even a minimum performance requirement may not be satisfied, and in such a case, the terminal device 102 may drop the transmission to the terminal device 103.

In some embodiments, the transmission form the terminal device 102 to the terminal device 103 may be scheduled by the network 101. In such an embodiment, the terminal device 102 may report a power headroom (PHR) for at least one of an uplink transmission and a sidelink transmission to a base station. The PHR may facilitate scheduling at the network device 101.

In an aspect of the present disclosure, a first terminal device is provided. The first terminal device comprises means for determining one or more power control parameters for a transmission from a second terminal device to the first terminal device; means for transmitting the one or more power control parameters to the second terminal device; and means for receiving the transmission from the second terminal device, the transmission being controlled based on the one or more power control parameters. In some embodiments, the first terminal device may be configured to perform method 300 described with reference to FIG. 3.

In some embodiments of the present disclosure, a second terminal device is provided. The second terminal device comprises means for receiving, from a first terminal device, one or more power control parameters for a transmission from the second terminal device to the first terminal device; means for determining a transmission power for the transmission based on the one or more power control parameters; and means for performing the transmission to the first terminal device according to the determined transmission power. In some embodiments, the second terminal device may be configured to perform method 400 described with reference to FIGS. 4-8.

Figure 9:
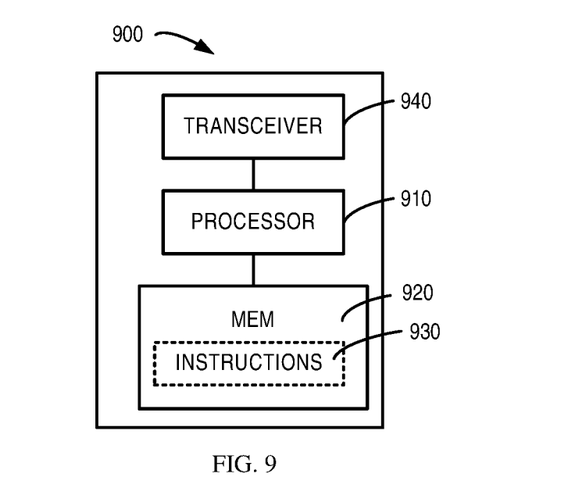
FIG. 9 illustrates a simplified block diagram of an apparatus that may be embodied as/in a network device or a terminal device.

FIG. 9 illustrates a simplified block diagram of an apparatus 900 that may be embodied in/as a terminal device (e.g., any of the terminal devices 102-104 in FIG. 1). The apparatus may be used for power control in a wireless communication system.

As shown by the example of FIG. 9, apparatus 900 comprises a processor 910 which controls operations and functions of apparatus 900. For example, in some embodiments, the processor 910 may implement various operations by means of instructions 930 stored in a memory 920 coupled thereto. The memory 920 may be any suitable type adapted to local technical environment and may be implemented using any suitable data storage technology, such as semiconductor based memory terminal devices, magnetic memory terminal devices and system, optical memory terminal devices and systems, fixed memory and removable memory, as non-limiting examples. Though only one memory unit is shown in FIG. 9, a plurality of physically different memory units may exist in apparatus 2100.

The processor 910 may be any proper type adapted to local technical environment, and may include one or more of general purpose computers, special purpose computers, microprocessors, digital signal processors DSPs and processors based on multicore processor architecture, as non-limiting examples. The apparatus 900 may also comprise a plurality of processors 910.

The processors 910 may also be coupled with a transceiver 940 which enables reception and transmission of information. For example, the processor 910 and the memory 920 can operate in cooperation to implement any of the methods 300-400 described with reference to FIGS. 3-8. It shall be appreciated that all the features described above with reference to FIGS. 3-8 also apply to apparatus 900, and therefore will not be detailed here.

Various embodiments of the present disclosure may be implemented by a computer program or a computer program product executable by one or more of the processors (for example processor 910 in FIG. 9), software, firmware, hardware or in a combination thereof.

Although some of the above description is made in the context of a communication network shown in FIG. 1, it should not be construed as limiting the spirit and scope of the present disclosure. The principle and concept of the present disclosure may be more generally applicable to other scenarios.

In addition, the present disclosure may also provide a carrier containing the computer program as mentioned above (e.g., computer instructions/program 930 in FIG. 9). The carrier includes a computer readable storage medium and a transmission medium. The computer readable storage medium may include, for example, an optical compact disk or an electronic memory device like a RAM (random access memory), a ROM (read only memory), Flash memory, magnetic tape, CD-ROM, DVD, Blue-ray disc and the like. The transmission medium may include, for example, electrical, optical, radio, acoustical or other form of propagated signals, such as carrier waves, infrared signals, and the like.

The techniques described herein may be implemented by various means so that an apparatus implementing one or more functions of a corresponding apparatus described with an embodiment comprises not only prior art means, but also means for implementing the one or more functions of the corresponding apparatus and it may comprise separate means for each separate function, or means that may be configured to perform two or more functions. For example, these techniques may be implemented in hardware (e.g., circuit or a processor), firmware, software, or combinations thereof. For a firmware or software, implementation may be made through modules (e.g., procedures, functions, and so on) that perform the functions described herein.

Some example embodiments herein have been described above with reference to block diagrams and flowchart illustrations of methods and apparatuses. It will be appreciated that each block of the block diagrams and flowchart illustrations, and combinations of blocks in the block diagrams and flowchart illustrations, respectively, may be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments may also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept may be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method implemented in a second terminal, comprising:
    determining a transmission power as a minimum one of a first value and a second value; and
    performing a transmission to a first terminal using the determined transmission power, wherein
        the first value is determined based on a first pathloss between the second terminal and a base station,
        the second value is determined based on a second pathloss between the second terminal and the 1st terminal, and
        the second value is determined based on a normalization factor for different numerologies.

2. The method according to claim 1, wherein the second value is determined based on a number of PRBs used for the transmission.

3. The method according to claim 1, wherein the second value is determined based on a sum of a base power level.

4. The method according to claim 1, wherein the second value is determined based on a pathloss compensation factor.

5. A second terminal comprising a processor configured to:
    determine a transmission power as a minimum one of a first value and a second value; and
    perform a transmission to a first terminal using the determined transmission power, wherein
        the first value is determined based on a first pathloss between the second terminal and a base station,
        the second value is determined based on a second pathloss between the second terminal and the first terminal, and
        the second value is determined based on a normalization factor for different numerologies.

6. The second terminal according to claim 5, wherein the second value is determined based on a number of PRBs used for the transmission.

7. The second terminal according to claim 5, wherein the second value is determined based on a sum of a base power level.

8. The second terminal according to claim 5, wherein the second value is determined based on a pathloss compensation factor.

* * * * *